United States Patent [19]

Kanda

[11] Patent Number: 5,231,429
[45] Date of Patent: Jul. 27, 1993

[54] FOLDABLE SPECTACLE FRAME

[75] Inventor: Koji Kanda, Osaka, Japan

[73] Assignee: Kanda Optical Co., Ltd., Japan

[21] Appl. No.: 869,800

[22] Filed: Apr. 16, 1992

[30] Foreign Application Priority Data

May 28, 1991 [JP] Japan .................................. 3-123576

[51] Int. Cl.$^5$ .......................... G02C 5/08; G02C 5/14
[52] U.S. Cl. ...................................... 351/63; 351/119; 351/118
[58] Field of Search ................. 351/63, 121, 153, 113, 351/118, 111, 119, 128; 2/450; 16/228

[56] References Cited

U.S. PATENT DOCUMENTS 4,740,069 4/1988 Baum ..................................... 351/57
4,820,035 4/1989 Kanda ................................. 351/153

FOREIGN PATENT DOCUMENTS 0056822 2/1982 European Pat. Off. .
WO89/06822 7/1989 France .

Primary Examiner—Rodney B. Bovernick
Attorney, Agent, or Firm—Pravel, hewitt, Kimball & Krieger

[57] ABSTRACT

A foldable spectacle frame having temples which are foldable to a thin form in the same plane as its lens frames without lapping over the lens frames. Each of the temples comprises an auxiliary temple member having a length corresponding to the vertical width of the lens frame and supported by an outer portion of upper side of the lens frame pivotally movably in a plane substantially orthogonal to the plane of the lens frame, and a main temple member pivoted to the auxiliary temple member rotatably in a plane orthogonal to the plane of pivotal movement of the auxiliary temple member. The spectacle frame further comprises a slide member slidably provided on the auxiliary temple member and having a length permitting a base end thereof to project from the auxiliary member, means for moving the slide member away from the lens frame when the main member is folded, and means for engaging the slide member with the lens frame by cooperation of the slide member and the lens frame. The slide member engages with the lens frame when the main member is brought into an unfolded state and disengages from the lens frame when the main member is folded.

8 Claims, 5 Drawing Sheets

FOLDABLE SPECTACLE FRAME

FIELD OF THE INVENTION

The present invention relates to improvements in foldable spectacle frames.

BACKGROUND OF THE INVENTION

Spectacle frames are known which comprise lens frames and temples which are foldable to a thin form in the same plane as the lens frames without lapping over the lens frames as shown in FIG. 8 (U.S. Pat. No. 4,820,035).

The opposed temples, indicated at 6 and 6a, each comprises an auxiliary temple member 3 and a main temple member 4. The auxiliary temple member 3 has a length corresponding to the vertical width of the lens frame 1, is supported by an outer portion of upper side 10 of the lens frame 1 and is movable about a pivot 31 in a plane substantially orthogonal to the plane of the lens frame 1. The main temple member 4 is pivoted as at 37 to the auxiliary temple member 3 and movable about the pivot 37 in a plane orthogonal to the plane of pivotal movement of the auxiliary temple member 3.

The auxiliary temple members 3 and the main temple members 4 of the above spectacle frame can be folded in the same plane as the lens frames 1. Accordingly, the spectacle frame has the advantage of being foldable to a smaller thickness than common spectacle frames having temples which lap over the lens frames when folded.

With the spectacle frame described, the auxiliary temple member 3 is biased in an unfolding direction by a torsion spring 32 at the portion thereof pivoted to the lens frame 1 as seen in FIGS. 2 and 3. However, the torsion spring 32 is small and low in spring force. Accordingly, when only one of the temples 6, 6a as unfolded, i.e., the temple 6, is grasped by one hand to wear the spectacles, the angle $a1$ of the temple with the plane of the lens frames 1 varies owing to the gravity acting on the lens frames 1 as shown in FIG. 9. Thus, the opposed temples 6, 6a are out of balance with respect to the plane of the lens frames 1, so that the spectacles tilt as shown in FIG. 10 if worn in this state. The spectacles must then be worn again after correcting the unfolded position of the auxiliary temple members 3 with both hands.

The present invention provides a spectacle frame which is free of the above problem.

SUMMARY OF THE INVENTION

The present invention provides a foldable spectacle frame comprising a lens frame, an auxiliary temple member having a length corresponding to the vertical width of the lens frame and supported by an outer portion of upper side of the lens frame pivotally movably in a plane substantially orthogonal to the plane of the lens frame, and a main temple member pivoted to the auxiliary temple member rotatably in a plane orthogonal to the plane of pivotal movement of the auxiliary temple member wherein the spectacle frame further comprises a slide member slidably provided on the auxiliary temple member and having a length permitting a base end thereof to project from the auxiliary temple member, means for moving the slide member in a direction away from the lens frame when the main temple member is folded, and means for engaging the slide member with the lens frame by cooperation of the slide member and the lens frame. The slide member engages with the lens frame when the main temple member is brought into an unfolded state and disengages from the lens frame when the main temple member is folded.

DESCRIPTION OF THE PREFERRED EMBODIMENTS

Figure 1:
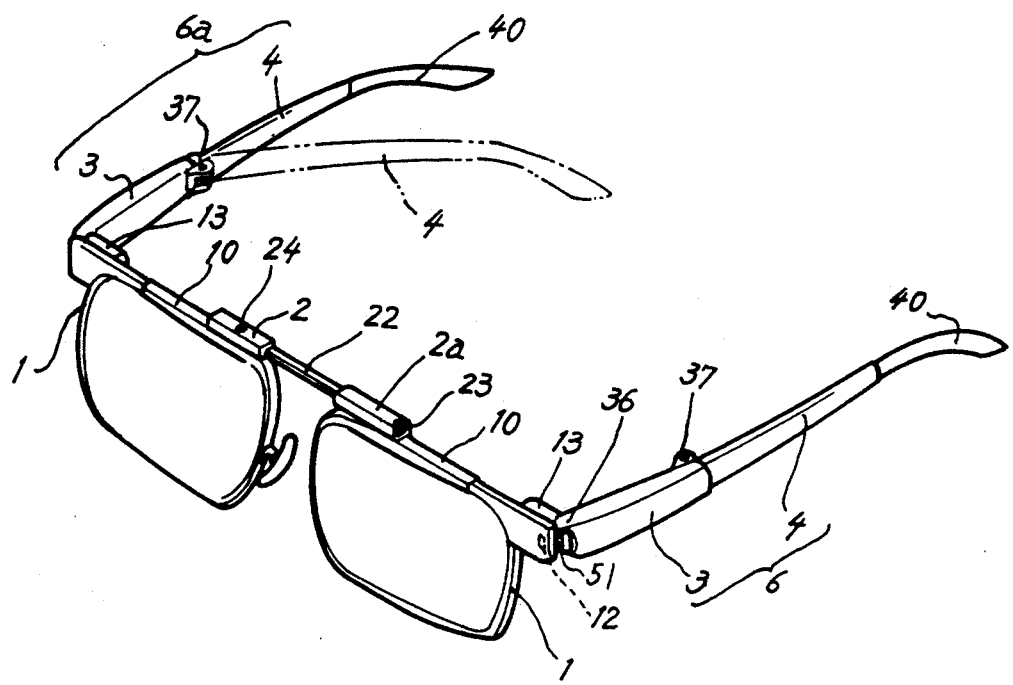
FIG. 1 is a perspective view of a spectacle frame embodying the invention.

The present invention will be described below in detail with reference to the embodiments shown in the drawings.

Figure 8:
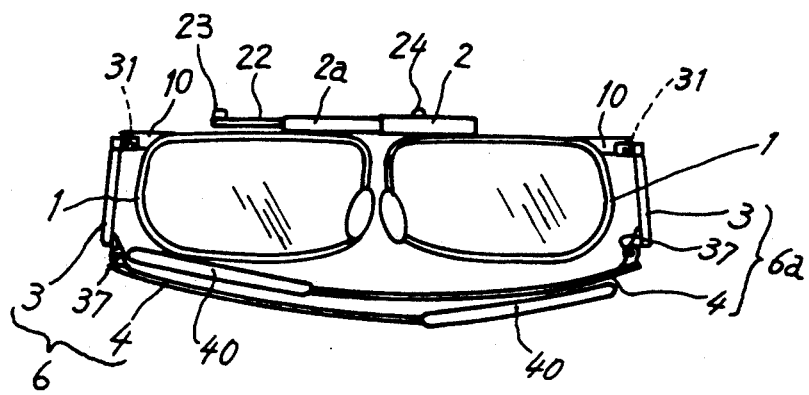
FIG. 8 is a plan view of prior art foldable spectacle frames wherein temples are folded in the same plane as lens frames.

The foregoing construction characteristic of the present invention is preferably incorporated into spectacle frames having opposite lens frames 1, 1 which are movable toward or away from each other (see FIGS. 1 and 8) because the spectacle frames of this type can be carried about as compacted to the greatest possible extent. However, the invention can of course be embodied as usual spectacle frames wherein the opposite lens frames are fixed to a bridge.

With reference to FIG. 1, holders 2, 2a each in the form of a flat tube of rectangular cross section are attached to the upper sides 10 of respective lens frames 1, 1 in opposed relation, and a bridge piece 22 is slidably fitted in and interconnects the two holders.

The bridge piece 22 is made of a metal strip and has a screw 23 screwed in one end thereof for preventing the piece from slipping off. At a portion close to the other end, the bridge piece 22 is locked in position adjustably by a lock screw 24 extending through the holder 2.

The lock screw 24 is tightened up with the distance between the centers of the lens frames 1, 1 adjusted to the distance between the pupils of the wearer. Accordingly, the two lens frames 1, 1 are slidable toward each other. When spaced apart by the largest distance, the lens frames 1, 1 are positioned in place for the respective pupils of the wearer.

Temples 6, 6a extending from the respective lens frames 1, 1 can be flexed each at two portions, i.e., at pivots 31 and 37, and folded in substantially the same plane as the lens frames 1, 1.

Figure 2:
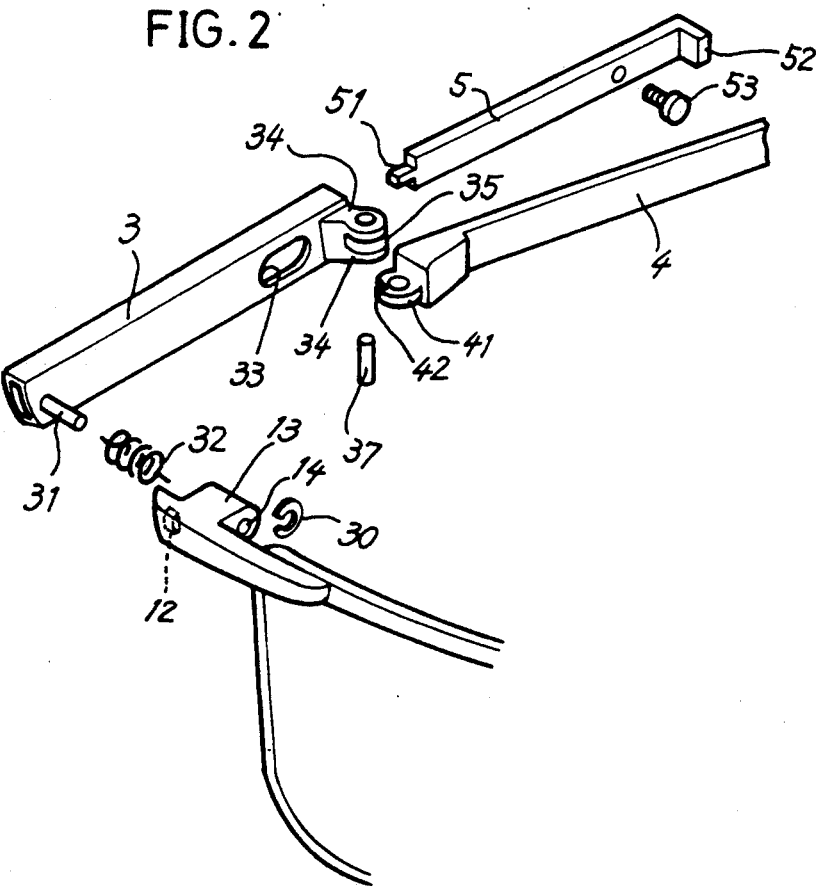
FIG. 2 is an exploded perspective view of an auxiliary temple member, main temple member and slide member.

As shown in FIGS. 1 and 2, the temples 6, 6a each comprise an auxiliary temple member 3 having a length corresponding to the vertical width of the lens frame 1, and a main temple member 4 having a free end provided with an end piece 40.

The auxiliary temple member 3 is in the form of a hollow tube having a rectangular cross section and opposite open ends. The pivot 31 extends from the forward end of the member 3 and is perpendicular to the lengthwise direction of the member. The pivot 31 is loosely inserted through a lateral bore 14 in a block 13 provided on the lens frame 1, and is prevented from slipping off by a retaining ring 30.

A torsion spring 32 is disposed in the clearance around the pivot 31 of the auxiliary temple member 3 in the lateral bore 14 of the lens frame 1. The torsion spring has one end attached to the pivot 31 or the temple member 3 and the other end engaged with the block 13 for biasing the auxiliary temple member 3 in an unfolding direction.

Outside the block 13, the lens frame 1 is formed with a recessed portion 12 engageable with a projection 51 on the slide member 5 to be described below.

Figure 9:
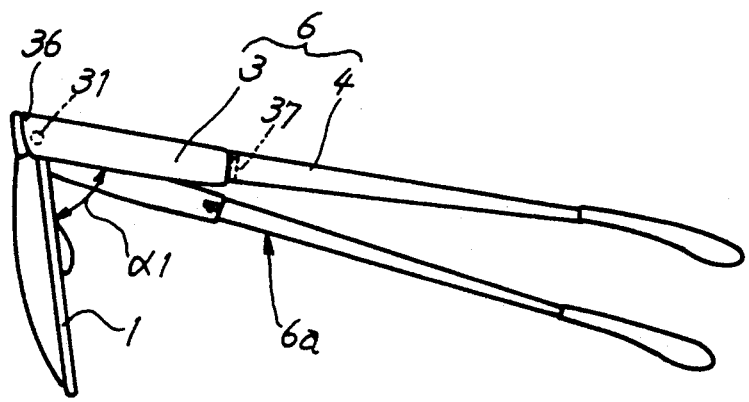
FIG. 9 is a side elevation showing the two temples as positioned at different angles with a plane including the lens frames.
Figure 10:
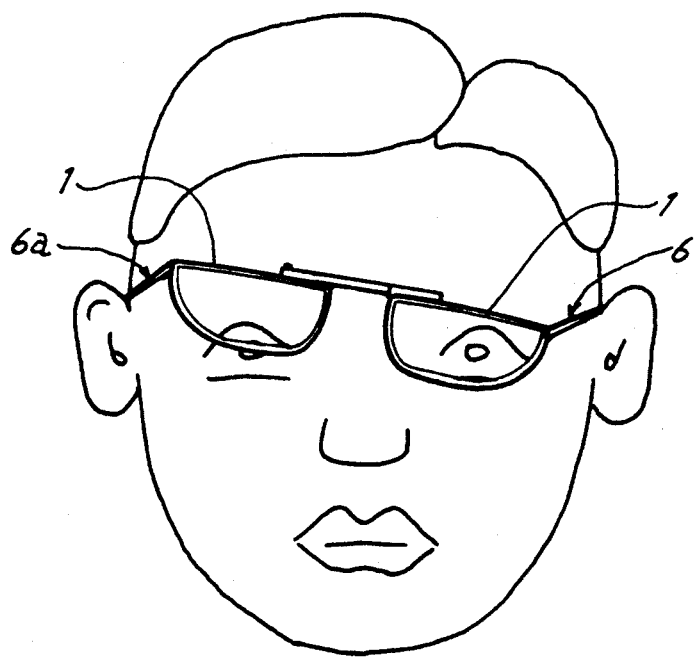
FIG. 10 is a front view showing tilted spectacles with the temples positioned at the different angles.

With reference to FIG. 9, the auxiliary temple member 3 has an abutting portion 36 at its forward end. The presence of the abutting portion limits the angle α1 the temple member 3 makes with the lens frame 1 to not greater than about 65 degrees.

As shown in FIG. 2, two brackets 34, 34 are formed on a side face of the free end of the auxiliary temple member 3. The main temple member 4 has a base end provided with a joint lug 41. With the joint lug 41 fitted in a groove 35 between the brackets 34, 34, the pivot 37 supports the main temple member 4 movably in a plane including the axis of the auxiliary temple member 3.

Figure 3:
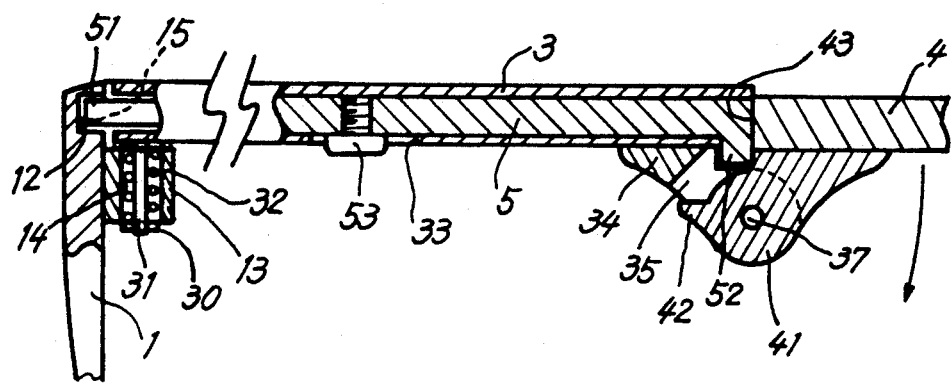
FIG. 3 is a sectional view showing the slide member as pushed in by unfolding the main temple member.

As seen in FIG. 3, the slide member 5 is slidably fitted in the auxiliary temple member 3 and formed at its forward end with the aforementioned projection 51 engageable with the recessed portion 12 of the lens frame 1. Alternatively, the recessed portion can of course be formed in the slide member 5, and the projection on the lens frame 1 for engagement therewith.

The other end of the slide member 5 projects from the free end of the auxiliary temple member 3 to provide an inwardly bent engageable portion 52. The joint lug 41 of the main temple member 4 has a claw 42 engageable with this portion 52.

A screw 53 for restraining the sliding movement of the slide member 5 is screwed in a side portion of the member 5 and slidably fitted in a slot 33 formed in the auxiliary temple member 3. The screw 53 is slidable over a distance corresponding to the length of the slot.

Figure 4:
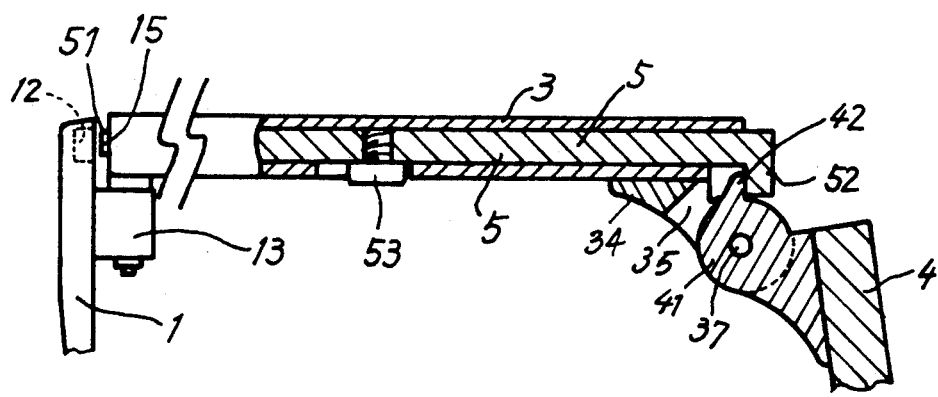
FIG. 4 is a sectional view showing the slide member as withdrawn by folding the main temple member.

When the main temple member 4 is folded toward the auxiliary temple member 3, the pawl 42 comes into engagement with the engageable portion 52 in the course of the folding movement to move the slide member 5 away from the lens frame 1 out of engagement therewith (see FIG. 4).

When the main temple member 4 is unfolded, the base end face of the member 4 serves as a portion 43 for pushing the base end of the slide member 5.

The spectacles are accommodated as folded in a spectable case (not shown). When the case is opened, each auxiliary temple member 3 is automatically unfolded by the force of the torsion spring 32, whereby the projection 51 on the slide member 5 sheathed in the temple member 3 is opposed to the recessed portion 12 of the lens frame 1.

When the main temple member 4 is unfolded in this state, the pushing portion 43 of the member 4 pushes the base end of the slide member 5, forcing the slide member 5 toward the lens frame 1.

This engages the projection 51 on the forward end of the slide member 5 with the recessed portion 12 of the lens frame 1 to lock the auxiliary temple member 3 in the unfolded state. Even if handled by one hand, the opposed temples 6, 6a will not be unfolded at different angles when the spectacles are to be worn. This eliminates the likelihood that the spectacles will be worn as tilted unlike the conventional spectacles.

When the main temple member 4 is folded, the claw 42 provided in the vicinity of the pivoted portion of the member 4 comes into engagement with the engageable portion 52 of the slide member 5 to pull out this member 4, whereby the projection on the slide member 5 is disengaged from the recessed portion 12 of the lens frame 1.

This permits the auxiliary temple member 3 to freely move pivotally for folding, with the result that the auxiliary temple member 3 and the main temple member 4 can be folded in the same plane as the lens frame 1.

In the above embodiment, the angle the main temple member 4 makes with the auxiliary temple member 3 is determined by the contact of the slide member restraining screw 53 with the outer end of the slotted portion 33 of the auxiliary temple member 3. For example, the angle is about 101.5 degrees.

Figure 5:
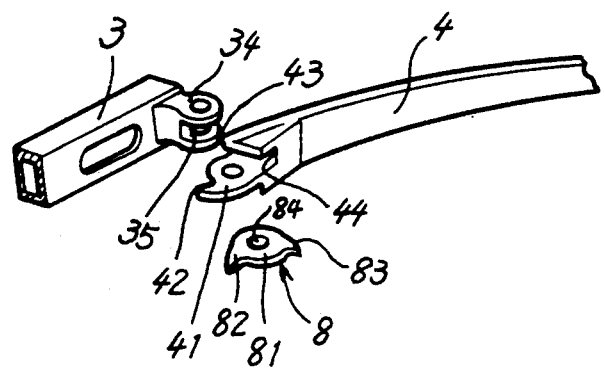
FIG. 5 is a perspective view of a pivotal joint between the auxiliary temple member and the main temple member, and a stopper piece incorporated in the joint.
Figure 6:
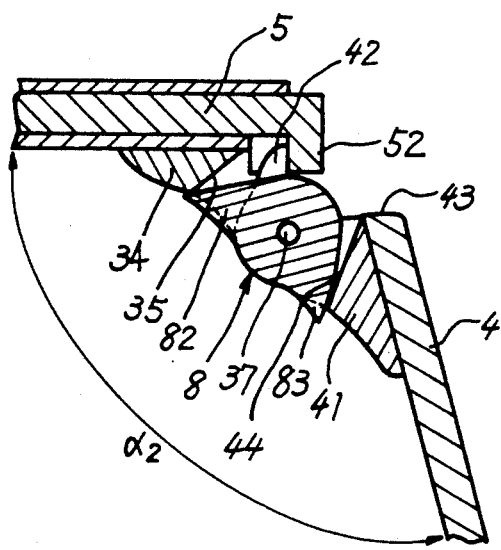
FIG. 6 is a sectional view of the pivoted portion of the main temple member including the stopper piece.

FIGS. 5 and 6 show another embodiment wherein a stopper 8 is provided at the pivoted portion of a main temple member 4 for determining the angle of the the member 4 as folded with respect to the auxiliary temple member 3.

The stopper 8 has two contact pieces 82, 83 projecting from a disk 81 integrally therewith and angularly spaced apart by about 125 degrees about the center of the disk. The pivot 37 is rotatably fitted in a hole 84 formed in the center of the disk 81. The angle α2 of the folded main temple member 4 can be limited to 101.5 degrees by the contact of the contact piece 82 with the bottom of the grooved portion 35 of the auxiliary temple member 3 and the contact of the other piece 83 with the bottom of a grooved portion 44 formed along the joint lug 41 of the main temple member 4.

Figure 7:
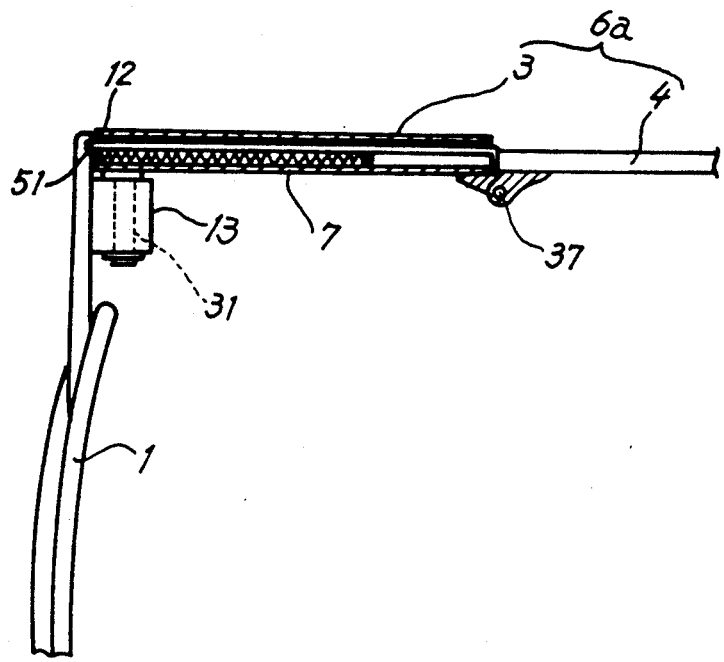
FIG. 7 is a sectional view showing an auxiliary temple member having a spring therein.

FIG. 7 shows another embodiment wherein a spring 7 is disposed within an auxiliary temple member 3 for biasing the slide member 5 toward the projecting direction. In this case, the claw 42 for withdrawing the slide member 5 need not be provided on the main temple member 4.

When the main temple member 4 is folded to release the base end of the slide member 5, the spring 7 forces the slide member 5 outward to disengage the projection 51 on the slide member 5 from the recessed portion 12 of the lens frame 1. Thus, the embodiment has the same advantage as already described.

The present invention is not limited to the foregoing embodiments but can be modified variously within the scope thereof as defined in the appended claims.

What is claimed is:

1. A foldable spectacle frame comprising a lens frame, an auxiliary temple member having a length corresponding to the vertical width of the lens frame and supported by an outer portion of upper side of the lens frame pivotally movably in a plane substantially orthogonal to the plane of the lens frame, and a main temple member pivoted to the auxiliary temple member rotatably in a plane orthogonal to the plane of pivotal movement of the auxiliary temple member, the spectacle frame being characterized in that the spectable frame comprises:

a slide member slidable on the auxiliary temple member and having a length permitting a base end thereof to project from the auxiliary temple member, means for moving the slide member in a direction away from the lens frame when the main temple member is folded, and means for engaging the slide member with the lens frame by cooperation of the slide member and the lens frame, the slide member being engageable with the lens frame when the main temple member is brought into an unfolded state and disengageable from the lens frame when the main temple member is folded.

2. A spectacle frame as defined in claim 1 wherein the means for moving the slide member comprises an engageable portion inwardly bent from the base end of the slide member, and a claw projecting from the main temple member in the vicinity of its pivoted portion, and the claw of the main temple member comes into contact with the engageable portion of the slide member to withdraw the slide member in the direction away from the lens frame when the main temple member is folded.

3. A spectacle frame as defined in claim 1 wherein the auxiliary temple member is in the form of a hollow tube, and the means for moving the slide member is a spring disposed within the auxiliary temple member for biasing the slide member in the direction away from the lens frame.

4. A spectacle frame as defined in claim 1 wherein the means for engaging the slide member with the lens frame comprises a projection formed on a forward end of the slide member, and a recessed portion formed in the lens frame and engageable with the projection.

5. A spectacle frame as defined in claim 1 wherein the means for engaging the slide member with the lens frame comprises a recessed portion formed in a forward end of the slide member, and a projection formed on the lens frame and engageable with the recessed portion.

6. A spectacle frame as defined in claim 2 wherein the auxiliary temple member is formed with a slot close to a base end thereof, and the slide member is provided on a side portion thereof with a member for restraining the slide movement of the slide member, the restraining member being slidably fitted in the slot and slidable over a distance corresponding to the length of the slot, the main temple member being foldable through an angle determined by the restraining member coming into contact with an outer end of the slotted portion of the auxiliary temple member.

7. A spectacle frame as defined in claim 2 wherein the main temple member has a stopper at its pivoted portion and is foldable through an angle determined by the stopper.

8. A spectacle frame as defined in claim 3 wherein the main temple member has a stopper at its pivoted portion and is foldable through an angle determined by the stopper.

* * * * *